Jan. 11, 1955
B. E. BEAMER
2,699,267
VEHICLE LIFTING AND TOWING APPARATUS
Filed Aug. 18, 1952
2 Sheets-Sheet 1
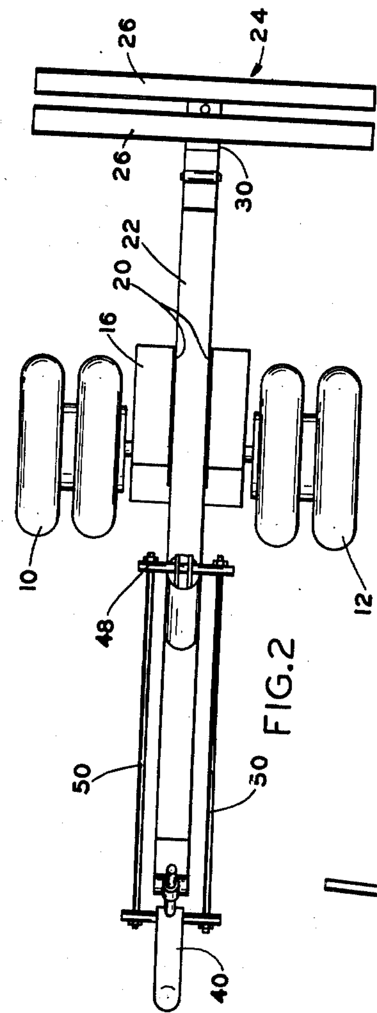
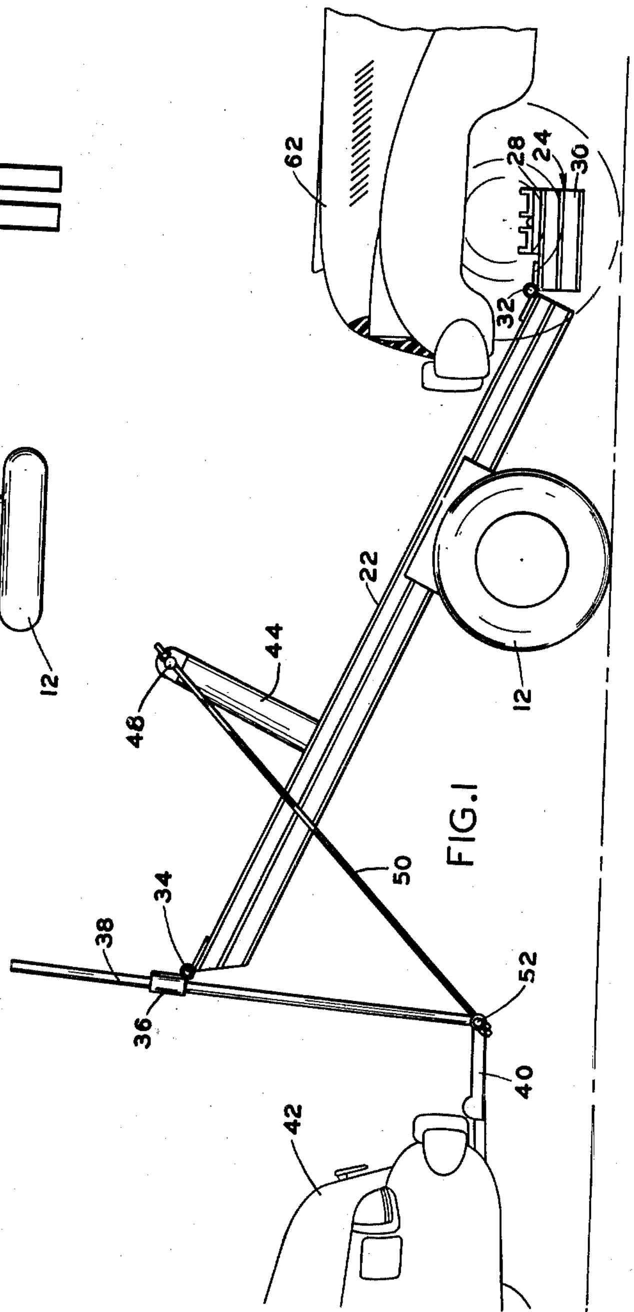
INVENTOR.
BERNIE E. BEAMER
BY
Lockwood, Galt, Woodard, & Smith Jan. 11, 1955 B. E. BEAMER 2,699,267

VEHICLE LIFTING AND TOWING APPARATUS

Filed Aug. 18, 1952 2 Sheets-Sheet 2

INVENTOR.
BERNIE E. BEAMER

BY

Lockwood, Galt, Woodard, & Smith

United States Patent Office 2,699,267

Patented Jan. 11, 1955

1

2,699,267

VEHICLE LIFTING AND TOWING APPARATUS

Birnie E. Beamer, Fort Wayne, Ind.

Application August 18, 1952, Serial No. 305,025

8 Claims. (Cl. 214—86)

The present invention relates to apparatus capable of lifting and moving a disabled vehicle, and more particularly to the provision of a relatively light weight, inexpensive construction which may be employed to elevate and transport an automobile which cannot move under its own power.

An object of this invention is to provide a combination lifting and towing apparatus economical in construction, reliable in operation, and efficient in use.

It is another object of this invention to provide combination lifting and towing apparatus constructed on the order of a small trailer-like dolly which may be operated and towed by any conventional passenger automobile or light truck, and requires the attention of only one person, namely, the driver of the towing vehicle.

It is another object of this invention to provide a trailer type of lifting and towing vehicle which may be manipulated by a single person for lifting and transporting a vehicle, which is substantially identical in weight and size to the towing vehicle, in an efficient, reliable and speedly manner.

It is still another object of this invention to provide an apparatus for lifting and moving vehicles or the like, which may be operated to position a towed vehicle on the apparatus, tow the vehicle to a selected destination, and remove the towed vehicle from the apparatus, all these operations being performed by a single individual.

Other objects of this invention will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is a side elevation of an embodiment of this invention showing a towing vehicle in position for operating said embodiment and a vehicle to be transported thereby;

Fig. 2 is a top plan view of the embodiment of Fig. 1;

Figure 3:
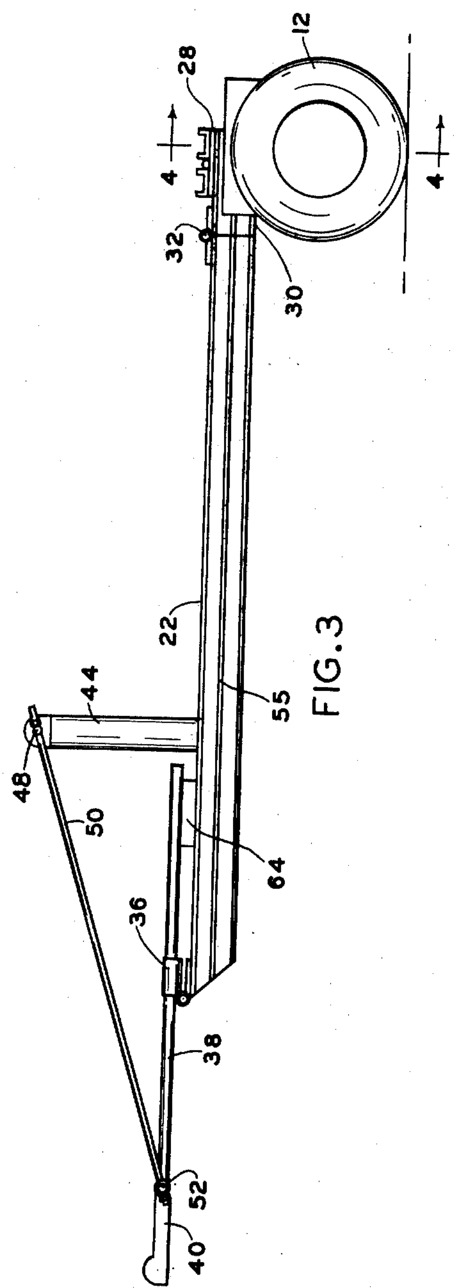
Fig. 3 is a side elevation of the construction of Fig. 1 showing the construction in extended, towing condition.
Figure 5:
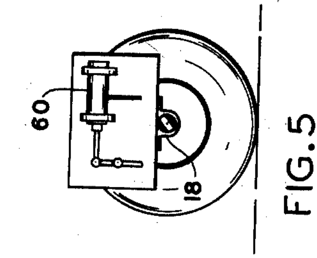
Fig. 5 is a section taken substantially on section line 5—5 of Fig. 4.

Referring to the drawings, a pair of dual wheels 10 and 12 rotatably supported in spaced relation on axle 14 are arranged to straddle a bearing box 16 rigidly secured to the aforesaid axle. Preferably, the bearing box 16 is secured to the axle 14 by means of brackets 18 which are secured to the underside of the box and which pass around in clamping relation the axle 14.

Figure 4:
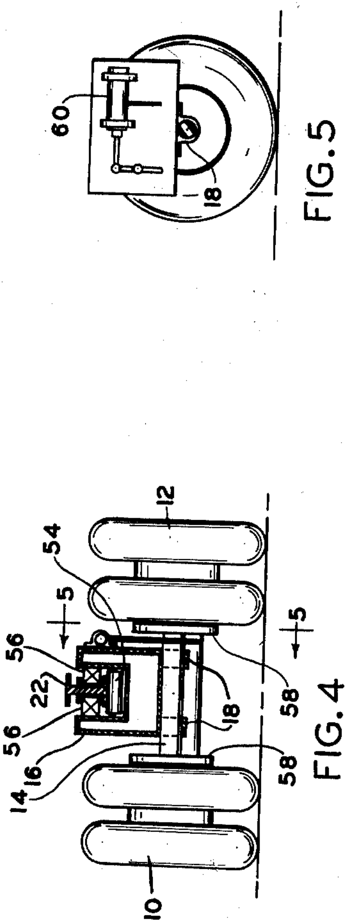
Fig. 4 is a sectional view taken substantially on section line 4—4 of Fig. 3.

As seen more clearly in Fig. 4, the bearing box 16 is channel shape in cross section so as to provide a longitudinally extending supporting groove 20 which serves a purpose to be explained in more detail hereafter. Slidably mounted in the bearing groove 20 is a main frame or I-beam 22 which is made suitably rigid and strong as will become apparent hereafter. On the right end of this frame 22 is hinged a carriage frame or carrier 24 which is comprised of two transversely extending parallel channel supports 26 secured to a pivot plate 28. This plate 28 is pivotally supported on an I-beam section 30 which is connected to the right end of the main frame 22 by means of hinge 32. With this arrangement, the carrier

2

24 can be swung upwardly or downwardly about the horizontal hinge pin of the hinge 32. Also, the supports 26 may be pivoted in a horizontal plane for a purpose which will become apparent hereafter.

On the left hand end of the main frame 22 is mounted a hinge construction 34 having a bearing sleeve 36 which receives therein for reciprocation a stabilizing bar 38. On the lower end of this stabilizing bar is pivotally connected a towing hitch 40 which is adapted to be operatively connected to a companion hitch member mounted on the rear of the towing vehicle 42.

Spaced back from the left hand end of the main frame 22 is an upright tie-column 44 which is made suitably strong and rigid and which is rigidly secured by welding or the like to the frame 22. A pivot shaft 48 is carried by the upper end of this column 44, and has connected to the opposite ends thereof two tow rods 50 which extend downwardly astraddle of the frame 22 to be connected to the opposite ends of another pivot shaft 52 carried in the rear portion of the hitch connection 40. This same pivot shaft 52 may be used to connect the stabilizing bar 38 to the hitch connection 40.

Now referring more particularly to Fig. 4, the underside of the frame 22 is shown riding on a roller bearing 54 of suitable size and strength which is secured between the lateral sides of the bearing groove 20 for free rotation. Thus, the frame 22 may be moved longitudinally with respect to the wheel and axle assembly on the bearing 54. Two other bearings 56 suitably secured to the opposite sides of the bearing groove 20 are arranged to guide the center section of the frame 22 against excessive lateral movement. Thus, by locking the wheels 10 and 12 against rotation, the frame 22 may be drawn to the left (see Fig. 1) until the carrier 24 is positioned on top of the roller 54 slightly ahead of the axis of the axle 14 (see Fig. 3). Guide rails 55 may be fixed both sides of the longitudinal extent of the web of frame 22 to overlie the side bearings 56.

While any suitable wheel-locking arrangement may be used, conventional hydraulic brakes having a suitable operating cylinder 60 are shown. By injecting a suitable hydraulic pressure into the cylinder 60, the brake shoes in the brakes 58 may be swung outwardly into engagement with the associated drums for locking the wheels 10 and 12 against rotation. If it is not desired to use brakes of this kind, it is of course entirely satisfactory to use stopping blocks on opposite sides of the wheels.

Referring now to Fig. 1, an explanation of the operation of this invention will be given. Assuming that the vehicle, generally indicated by the reference numeral 62, and shown in outline form, is to be towed, the frame 22 is manipulated so as to position the supports 26 of the carrier 24 directly beneath and in parallel alignment with the front suspension system of the vehicle. Chains or the like are now passed around the opposite ends of the supports 26 and the adjacent portions of the aforementioned suspension so as to insure a towing connection between the vehicle and the supports. Next, the hitch 40 is connected to the companion hitch member of the towing vehicle 42, and the towing car driven forwardly. Before starting forwardly, however, it is necessary that the wheels 10 and 12 be blocked against forward rotation. The forward motion of the towing vehicle will now be transferred to the main frame 22 by means of the tow-rods 50 and the tie-column 44. The main frame 22 will now be drawn longitudinally forwardly with respect to the bearing box 16, and the carrier 24 is drawn forwardly, carrying the vehicle 62 therewith, eventually pulling the carrier 24 and the vehicle upon the support bearing 54. A suitable stop is provided for stopping the movement of the carrier 24 with respect to the bearing box 16 just ahead of the axis of the axle 14. However, for practical purposes, the load of the towed vehicle 62 should substantially coincide with a vertical line passed through said axis so as to prevent the vehicle from rocking backwardly or forwardly about the axle 14.

With the vehicle now supported over the axle 14, the wheels 10 and 12 may be unlocked, and the towed vehicle 62 transported to any desired destination.

As viewed in Fig. 3, the stabilizing bar 38 is pivoted to a position substantially parallel with the main frame 22, and a pillow block 64 may be provided on the upper side of frame 22 to be engaged by the right hand end of bar 38 to prevent the left end of the frame 22 from falling below a preferred position.

The invention in the aforedescribed embodiment resides chiefly in the fact that the towing connection between the lifting dolly and the vehicle is made at a point which is between the ends of the main frame and above the plane of the main frame. By means of force diagrams, the importance of this connection point may be clearly demonstrated. It can be shown that the forward movement of the towing vehicle is operative to transmitt he maximum longitudinal force to the main frame 22 so that a minimum of lifting force is communicated to the rear of the tow-car 42.

This relationship of forces can be explained by assuming that the connection between the tow car 42 and the main frame 22 is at the left end of main frame 22. Now, as the lifting operation progresses, the left end of the frame 22 swings upwardly, and it can be shown that this swinging action is so quick and forceful, that the rear wheels of the towing car 42 will be lifted out of traction engagement with the ground. Thus, the loading operation is stalled, and can only be accomplished if considerable weight is applied to the rear axle of the tow car 42. By the present arrangement of connecting the tow rods to the disclosed points, vertical lifting forces transmitted to the car 42 are maintained at a satisfactory minimum and in actual operation have been found to be negligible.

By means of this invention, applicant has devised a novel and unique loading and transporting apparatus which needs no special towing equipment and which may be operated by a single person. Also, the construction of the present invention is such that it can be produced economically and therefore owned by small garages and service stations which normally cannot afford vehicle towing equipment.

What is claimed is:

1. A towing and loading apparatus of the character described comprising an axle having wheels rotatably supported on the ends thereof, a bearing box secured to said axle between said wheels, said box having a bearing channel therethrough which extends transversely of said axle, a main frame slidably received by said channel, a bearing carried in the bottom portion of said channel, said frame riding over said bearing whereby said frame can be moved longitudinally with respect to said box, two other bearings carried by said box and operative to guide laterally said frame, a carrier hingedly mounted on one end of said frame and having pivotable channel supports which extend transversely of said frame, a stabilizing bar hingedly and slidably carried on the other end of said frame, a hitch connection pivotally connected to one end of said stabilizing bar, a tie-column secured to the upper side of and intermediate the ends of said frame and extending upright therefrom, a tow rod having one end pivotally connected to the upper end of said tie-column and the other end pivotally connected to said hitch connection, and brakes on said wheels for locking the latter against rotation.

2. A towing and loading apparatus of the character described comprising an axle having wheels rotatably supported on the ends thereof, a bearing box secured to said axle between said wheels, said box having a bearing channel therethrough which extends transversely of said axle, a main frame slidably received by said channel, a bearing carried in the bottom portion of said channel, said frame riding over said bearing whereby said frame can be moved longitudinally with respect to said box, two other bearings carried by said box and operative to guide laterally said frame, a carrier hingedly mounted on one end of said frame and having pivotable channel supports which extend transversely of said frame, a stabilizing bar hingedly and slidably carried on the other end of said frame, a hitch connection pivotally connected to one end of said stabilizing bar, a tie-column secured to the upper side of and intermediate the ends of said frame and extending upright therefrom, and a tow rod having one end pivotally connected to the upper end of said tie-column and the other end pivotally connected to said hitch connection.

3. A loading and towing apparatus of the character described comprising an axle having wheels rotatably supported on the ends thereof, a bearing mechanism secured to said axle between said wheels, said mechanism having a bearing channel therethrough which extends transversely of said axle, a main frame slidably received by said channel, a bearing carried in the bottom portion of said channel, said frame riding over said bearing whereby said frame can be moved longitudinally with respect to said mechanism, bearing means included in said mechanism operative to guide said frame laterally, a carrier hingedly mounted on one end of said frame and having pivotable channel supports which extend transversely of said frame, a stabilizing bar hingedly and slidably carried on the other end of said frame, a hitch connection pivotally connected to one end of said stabilizing bar, a tie-column secured to the upper side of and intermediate the ends of said frame and extending upright therefrom, a tow rod having one end pivotally connected to the upper end of said tie-column and the other end pivotally connected to said hitch connection.

4. A loading and towing apparatus of the character described comprising an axle having wheels rotatably supported on the ends thereof, a bearing mechanism secured to said axle between said wheels, said mechanism having a bearing channel therethrough which extends transversely of said axle, a main frame slidably received by said channel, a bearing carried in the bottom portion of said channel, said frame riding over said bearing whereby said frame can be moved longitudinally with respect to said mechanism, a carrier hingedly mounted on one end of said frame and having pivotable channel supports which extend transversely of said frame, a stabilizing bar hingedly and slidably carried on the other end of said frame, a hitch connection pivotally connected to one end of said stabilizing bar, a tie-column secured to the upper side of and intermediate the ends of said frame and extending upright therefrom, and a tow rod having one end pivotally connected to the upper end of said tie-column and the other end pivotally connected to said hitch connection.

5. A loading and towing apparatus of the character described comprising an axle having wheels rotatably supported on the ends thereof, a bearing mechanism secured to said axle between said wheels, said mechanism having a bearing portion which extends transversely of said axle, a main frame slidably received by said portion, a carrier hingedly mounted on one end of said frame and having pivotable channel supports which extend transversely of said frame, a stabilizing bar hingedly and slidably carried on the other end of said frame, a hitch connection pivotally connected to one end of said stabilizing bar, a tie-column secured to the upper side of and intermediate the ends of said frame and extending upright therefrom, and a tow rod having one end pivotally connected to the upper end of said tie-column and the other end pivotally connected to said hitch connection.

6. A loading and towing apparatus of the character described comprising an axle having wheels rotatably supported on the ends thereof, a bearing mechanism secured to said axle between said wheels, a main frame slidably received by said mechanism, said frame being movable longitudinally with respect to said mechanism, carrier means hingedly supported on one end of said frame and having pivotable supporting members which extend transversely of said frame, a stabilizing member hingedly and slidably carried on the other end of said frame, a hitch connection pivotally connected to one end of said stabilizing member, a tie-column secured to the upper side of and intermediate the ends of said frame and extending upright therefrom, and a tow rod having one end pivotally connected to the upper end of said tie-column and the other end pivotally connected to said hitch connection.

7. A loading and towing apparatus of the character described comprising an axle having wheels rotatably supported on the ends thereof, a bearing mechanism secured to said axle between said wheels, a main frame slidably received by said mechanism, said frame being movable longitudinally with respect to said mechanism, carrier means hingedly supported on one end of said frame and having pivotable supporting members which extend transversely of said frame, a stabilizing member hingedly and slidably carried on the other end of said frame, hitch means pivotally connected to one end of said stabilizing bar, connection means secured to the upper side of and intermediate the ends of said frame and extending upright therefrom, and a tow connection having one end pivotally connected to the upper end of said connection means and the other end pivotally connected to said hitch means.

8. A loading and towing apparatus of the character described comprising a horizontal support having a bearing device, frame means slidably mounted on said bearing device for both pivotal and reciprocal movement relative thereto, connection means carried by said frame means and extending upwardly therefrom with respect to said bearing device, and a tow coupling operatively connected to said connection means at a point above said frame means for moving said frame means on said bearing device.

References Cited in the file of this patent

UNITED STATES PATENTS

| | | |
|---|---|---|
| 1,678,395 | Kellems | July 24, 1928 |
| 1,941,400 | Johnson | Dec. 26, 1933 |
| 2,316,702 | McDaniel | Apr. 13, 1943 |
| 2,351,829 | Milner | June 20, 1944 |
| 2,408,862 | Lisota | Oct. 8, 1946 |
| 2,553,229 | Barhorst | May 15, 1951 |
| 2,564,111 | Kimball | Aug. 14, 1951 |
| 2,572,636 | Le Tourneau | Oct. 23, 1951 |
| 2,628,733 | Hale | Feb. 17, 1953 |

FOREIGN PATENTS

| | | |
|---|---|---|
| 247,770 | Great Britain | Feb. 25, 1926 |
| 256,334 | Great Britain | Aug. 9, 1926 |
| 726,877 | France | June 4, 1932 |